Sept. 2, 1924.
A. H. LUHRMAN
1,507,076
PROCESS FOR PREPARING WOODEN STORAGE BATTERY SEPARATORS
Filed Nov. 16, 1921
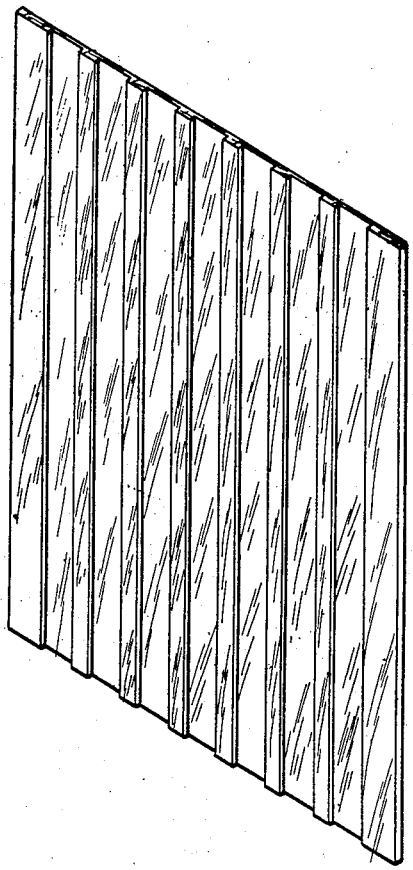
Inventor
Albert H. Luhrman
By Walter F. Murray
Attorney Patented Sept. 2, 1924.

1,507,076

UNITED STATES PATENT OFFICE.

ALBERT H. LUHRMAN, OF CINCINNATI, OHIO.

PROCESS FOR PREPARING WOODEN STORAGE-BATTERY SEPARATORS.

Application filed November 16, 1921. Serial No. 515,666.

*To all whom it may concern:*

Be it known that I, ALBERT H. LUHRMAN, a citizen of the United States of America, and a resident of Cincinnati, in the county of Hamilton and State of Ohio, have invented a new and useful Improvement in a Process for Preparing Wooden Storage-Battery Separators, of which the following is a specification.

Heretofore it has been necessary to keep wooden storage battery separators moist during storage and shipment to avoid cracking, splitting and warping of the separators.

An object of my invention is to provide wooden storage battery separators that may be stored and shipped in a dry state.

This object is attained by the means described herein, and illustrated in the accompanying drawing.

The figure is a perspective view of a separator of the type referred to.

My process comprises forming the separator to the desired shape and then boiling the separator in any of the various preparations employed to remove therefrom the material deleterious to storage batteries. As an example, a caustic soda solution may be employed for this purpose. After the separator has been boiled sufficiently to remove said materials, the separator is thoroughly washed to remove the acids, resins, etc., from the cells of the separator. Then the separator is boiled in a solution containing a neutral soluble substance, until the separator is impregnated with such substance. One of the solutions that may be used for this purpose is water and sugar.

After the neutral soluble substance, which hereafter I will refer to as sugar, has filled the cells of the separator, the separator is permitted to dry, the sugar crystallizing in the cells. After the separators are dry, they may be stored either in or independently of the storage battery jar.

It is customary to assemble storage batteries prior to shipment, and the dry separators impregnated as described, may be inserted in the batteries without injury to the battery.

When the battery is to be charged, the sugar is soaked out of the pores or cells of the separators by flushing the cells with water. The sugar will dissolve readily, and several flushings, permitting the separators to soak for a while, will wash practically all of the sugar from the separators. The little sugar that might be left in the battery is ultimately decomposed by the chemical action within the battery.

It has been found that when batteries are prepared with separators of this type, there is no potential registered on a sensitive voltmeter, that no local actions are set up on the plates while the battery is dry. Also, there is no danger of freezing during shipment in cold weather.

What I claim is:—

1. The process of boiling wood in a solution adapted to remove resins, etc., from the cells of the wood, washing the wood after such boiling, and then boiling the wood in a solution containing a neutral soluble crystalline material adapted to enter the cells of the wood, and to crystallize in the cells as the wood is dried.

2. The process of making storage battery separators comprising treating natural wood to remove therefrom the materials deleterious to storage batteries and then impregnating the separators with a neutral soluble crystalline substance.

3. The process of making storage battery separators comprising forming separators out of wood, treating the separators to remove from the wood those materials deleterious to storage batteries, and impregnating the separators with a neutral soluble crystalline substance.

4. The process of making storage battery separators, comprising forming wooden separators, treating the separators to remove therefrom the materials deleterious to storage batteries, impregnating the separators in a solution of water and sugar, and permitting the sugar to crystallize in the separator cells.

5. The process of preparing storage battery separators for storage and use comprising treating natural wood to remove therefrom the materials deleterious to storage batteries, impregnating the separators with a neutral soluble crystalline substance, drying the separators, whereby the neutral soluble substance crystallizes in the separator cells and retains the cells in their original shape and form, whereupon the separators may be stored in a dry state, and washing from the cells the neutral soluble substance when building up a storage battery and before admission to the battery of the electrolyte.

In testimony whereof, I have hereunto subscribed my name this 15th day of November, 1921.

ALBERT H. LUHRMAN.